United States Patent
König et al.

(10) Patent No.: US 6,559,264 B1
(45) Date of Patent: May 6, 2003

(54) MALONIC ACID ESTER/TRIAZOLE MIXED BLOCKED HDI TRIMER/FORMALDEHYDE STABILIZATION

(75) Inventors: Eberhard König, Leverkusen (DE); Hans-Ulrich Meier-Westhues, Leverkusen (DE); Thomas Klimmasch, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/857,087

(22) PCT Filed: Nov. 24, 1999

(86) PCT No.: PCT/EP99/09069

§ 371 (c)(1),
(2), (4) Date: Aug. 2, 2001

(87) PCT Pub. No.: WO00/34356

PCT Pub. Date: Jun. 15, 2000

(30) Foreign Application Priority Data

Dec. 7, 1998 (DE) .......................................... 198 56 412
Dec. 10, 1998 (DE) .......................................... 198 56 968

(51) Int. Cl.⁷ ...................... C08G 18/80; C07C 263/18; C07C 265/00

(52) U.S. Cl. .................. 528/45; 252/182.2; 252/182.29; 252/182.21; 524/99; 524/191; 524/354; 524/718; 524/728; 524/770; 524/772; 528/48; 528/49; 528/73; 560/331; 560/336; 560/355

(58) Field of Search .............................. 528/45, 48, 49, 528/73; 252/182.2, 182.29, 182.21; 560/331, 336, 355; 524/99, 191, 354, 718, 728, 770, 772

(56) References Cited

U.S. PATENT DOCUMENTS

| | | | |
|---|---|---|---|
| 5,350,825 A | 9/1994 | König et al. | 528/45 |
| 5,523,377 A | 6/1996 | König et al. | 528/45 |
| 5,552,496 A * | 9/1996 | Vogt-Birnbrich et al. | 525/440 |
| 5,691,438 A | 11/1997 | König et al. | 528/45 |
| 6,060,573 A * | 5/2000 | Konig et al. | 528/45 |

FOREIGN PATENT DOCUMENTS

| | | |
|---|---|---|
| EP | 0 584 818 | 3/1994 |
| EP | 0 829 500 | 3/1998 |
| EP | 0 947 531 | 10/1999 |

* cited by examiner

Primary Examiner—Rabon Sergent
(74) Attorney, Agent, or Firm—Joseph C. Gil; Thomas W. Roy

(57) ABSTRACT

The present invention relates to blocked polyisocyanate crosslinking agents, to the production thereof and to the use thereof in single-component stoving lacquers, particularly OEM clear lacquers (original equipment material, initial lacquer coating).

8 Claims, No Drawings

MALONIC ACID ESTER/TRIAZOLE MIXED BLOCKED HDI TRIMER/FORMALDEHYDE STABILIZATION

BACKGROUND OF THE INVENTION

The present invention relates to blocked polyisocyanate crosslinking agents, to the production thereof and to the use thereof in single-component stoving lacquers, particularly OEM clear lacquers (original equipment material, initial lacquer coating).

As is known, blocked polyisocyanates are used as additives which impart improvements to single-component stoving lacquers which are used in the lacquer coating of automobiles. The stringent requirements of improved lacquer technology properties can be fulfilled relatively satisfactorily by blocked polyisocyanates. Other properties, however, such as a low stoving temperature up to a maximum of 140° C., or reduced thermal yellowing when overstoved, cannot be achieved with all the raw materials which are available.

The most important industrial lacquer polyisocyanates are based on 1,6-diisocyanatohexane (HDI). The available blocking agents for polyisocyanates on an industrial scale when maximum deblocking temperatures of 140° C. are required are malonic esters and 1,2,4-triazole. A combination of HDI-based polyisocyanates with malonic esters or 1,2,4-triazole, or, as shown in the comparative example given later, with a malonic ester/1,2,4-triazole mixture, does not result in a usable liquid lacquer crosslinking agent which is stable on storage, because these products crystallise out. The tendency of HDI polyisocyanates blocked with malonic ester to crystallise is already known from EP-A 600 314, and that of triazole-blocked polyisocyanates is known from EP-A 654 490 and 741 157.

The object of the present invention was to modify polyisocyanates which are based on HDI and which are blocked with mixtures of malonic ester and 1,2,4-triazole, in order to form liquid crosslinking agents, which do not crystallise in solvents, for single-component stoving lacquers.

It has been possible to achieve this object with the blocked polyisocyanates described below.

SUMMARY OF THE INVENTION

The present invention relates to aliphatic and/or cycloaliphatic polyisocyanates, wherein
  A) 5–95, preferably 70 to 30, equivalent % of the isocyanate groups thereof are blocked (reacted) with an acidic CH ester,
  B) 5–95, preferably 70 to 30, equivalent % of the isocyanate groups thereof are blocked (reacted) with 1,2,4-triazole, and
  C) 0–10 equivalent % of the isocyanate groups thereof are blocked (reacted) with other blocking agents which are different from A) and B),
characterised in that they contain 0.05–1.0 moles of formaldehyde in incorporated form with respect to 100 equivalent % of blocked NCO groups.

The present invention also relates to a method of producing the non-crystallising blocked polyisocyanates according to the invention from
  a) 100 equivalent % of aliphatic and/or cycloaliphatic polyisocyanate components,
  b) 5–95, preferably 70 to 30, equivalent % of a blocking agent from the group comprising acidic CH esters,
  c) 5–95, preferably 70 to 30, equivalent % of 1,2,4-triazole,
  d) 0–10 equivalent % of a blocking agent which is different from b) and c), and
  e) 0.05–1.0 moles of formaldehyde,
characterised in that the formaldehyde is added with catalytic amounts of a base after complete reaction of the NCO groups present, and is reacted out.

DETAILED DESCRIPTION OF THE INVENTION

The non-crystallising, blocked polyisocyanates according to the invention preferably have a content of stabilisers against thermal yellowing amounting to 0.1–5.0% by weight of hydrazides comprising a structural unit of formula (I)

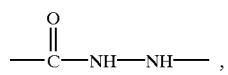

(I)

and 0.1–5.0% by weight of "HALS amines" comprising a structural unit of formula (II).

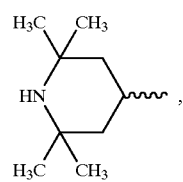

(II)

Stabilisers of this type are known from EP-A-829 500, for example.

Finally, the present invention relates to the use of the blocked polyisocyanates according to the invention as crosslinking agents for organic polyhydroxyl compounds in polyurethane stoving lacquers, for example for automobile clear lacquers.

A content of formaldehyde is an essential feature of the invention for the claimed polyisocyanate crosslinking agents. Surprisingly, formaldehyde exhibits two modes of action:

Firstly, it prevents crystallisation of the blocked polyisocyanates, particularly if the polyisocyanate component is based on HDI. Secondly, it increases the resistance of the blocked polyisocyanates to thermal yellowing.

0.1 to 0.4 moles paraformaldehyde are preferably used per 100 equivalent % of blocked polyisocyanate, and are incorporated by reaction by means of a catalyst such as Na methylate, for example. This is equivalent to about 0.8 to 5.0% by weight of formaldehyde with respect to the blocked polyisocyanate. A formaldehyde content of 2.0 to 3.0% by weight with respect to the blocked polyisocyanate is most particularly preferred.

The method according to the invention is carried out as follows:

The polyisocyanate component is placed in a reaction vessel, optionally together with a little solvent, e.g. 1-methoxy-2-propyl acetate (MPA), at about 50° C., the acidic CH ester, e.g. malonic ester, is added thereto as a mixture with about 2% of a 30% Na methylate solution and is reacted at 70–90° C. to give the calculated NCO content.

Thereafter, the calculated amount of 1,2,4-triazole is added, dissolved in further MPA, and is reacted out at about 90° C. so that NCO can no longer be detected. The batch is cooled to about 45° C. and the clear solution of paraformaldehyde, which is about 3% with respect to paraformaldehyde, is added to a mixture comprising 30% Na methylate solution as a base and isobutanol, and is subsequently stirred at 45° C. for about 1 hour. The formaldehyde is incorporated in the course of this procedure; the content of free formaldehyde is at the analytical detection limit. About 0.5%, with respect to the batch, of dibutyl phosphate is added thereto and the pH is adjusted to about 7.5–7.0 therewith. According to one particular embodiment of the invention, other stabilisers against thermal yellowing can also be added in addition to this clear solution.

The polyisocyanates on which the blocked polyisocyanates according to the invention are based are known lacquer polyisocyanates which comprise aliphatically and/or cycloaliphatically and/or aromatically bonded isocyanate groups and which have an isocyanate content of 7 to 30, preferably 12 to 25% by weight.

The polyisocyanates which are preferably used are lacquer polyisocyanates known in the art, which comprise biuret, isocyanurate, urethane, allophanate and/or uretdione groups and which are based on 1,6-diisocyanatohexane (HDI), 1-isocyanato-3,3,5-trimethyl-5-isocyanatomethylcyclohexane (IPDI) and/or bis-(4-isocyanatocyclohexyl)-methane ($H_{12}MDI$ or Desmodur W®/Bayer AG). In addition, lacquer polyisocyanates which are trimerised asymmetrically, and which therefore comprise iminooxadiazinedione groups in addition to isocyanurate, and which are based on 1,6-diisocyanatohexane can also be used, such as those described in EP-A 798 299 for example.

Polyisocyanates based on other isocyanates can also be used, such as those based on diisocyanatobutane-1,4, 2,4- or 2,6-diisocyanato-1-methyl-cyclohexane, 2,5- and/or 2,6-bis-isocyanato-norbornane, 3- and/or 4-isocyanatomethyl-1-methylcyclohexane, 1,4-bis-(2-isocyanato-prop-2-yl)-benzene, 1,3-diisocyanatomethylbenzene, or 1,3- or 1,4-bis-isocyanatomethylcyclohexane, for example.

The substances which are most particularly preferred as the polyisocyanate component, however, are polyisocyanates which comprise isocyanurate and which are based on 1,6-diisocyanatohexane.

The substances which are used as the blocking component firstly comprise acidic CH esters, for example diethyl malonate or ethyl acetate and/or methyl, isopropyl, isobutyl or tert.-butyl derivatives thereof. Diethyl malonate is preferred. Secondly, 1,2,4-triazole is used in said blocking mixture, 1,2,4-triazole is produced on a large scale industrially from 1 mole of hydrazine hydrate and at least 2 moles of formamide. The acidic CH ester and triazole can each be used in amounts of 5–95 equivalent %, preferably 20–80 equivalent %.

The following substances can be used in conjunction as further blocking agents in amounts up to 50 equivalent %, preferably up to 20 equivalent %: oximes, such as butanone oxime for example, secondary amines e.g. diisopropylamine, acidic NH heterocycles, such as imidazole or 3,5-dimethylpyrazole for example, or lactams e.g. ε-caprolactam.

The stabilisers which are known from EP-A 0 829 500 can be used as additional stabilising components. The substance which is preferred in this connection is the hydrazide of formula (Ia)

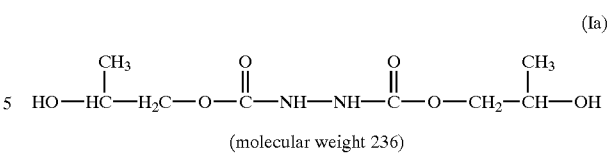

(molecular weight 236)

which is readily obtainable by the addition of hydrazine hydrate to 2 moles of propylene carbonate, and the HALS amine Tinuvin 770 DF® (manufactured by Novartis) which is not substituted at the N atom. 3 to 6% by weight of the former stabiliser is preferably used, and 0.5 to 1.5% by weight of the latter stabiliser is preferably used, with respect to the blocked polyisocyanate in each case.

The solvents which can be used are those which are known from polyurethane chemistry and which are inert to NCO groups, for example 1-methoxy-2-propyl acetate, solvent naphtha 100 or butyl acetate. If the NCO groups are blocked, alcohols e.g. isobutanol are also preferably used in order to facilitate transesterification with the alcohol residues of the blocking agents.

The advantages of the polyisocyanate crosslinking agents according to the invention, namely their good shelf life, i.e. no crystallisation, reduced thermal yellowing and good lacquer technology properties, are explained with reference to the following examples.

EXAMPLES

Example 1

(According to the Invention)

This mixture-blocked polyisocyanate was stabilised with 3.0% of formaldehyde with respect to the solids content of the blocked polyisocyanate. The ratio of blocking agents corresponded to malonic ester:triazole=40:60 equivalent % with respect to 100 equivalent % of NCO groups.

Batch

| | | |
|---|---|---|
| 200.0 g | (1 equivalent) | of an isocyanurate-containing lacquer polyisocyanate based on 1.6-diisocyanato-hexane (HDI) with an NCO content of about 21% |
| 64.0 g | (0.4 mol) | diethyl malonate |
| 41.4 g | (0.6 mol) | 1,2,4-triazole |
| 9.0 g | (0.3 mol) | paraformaldehyde |
| 65.2 g | | methoxypropyl acetate |
| 65.2 g | | isobutanol |
| 434.8 g | (1.0 equivalent) | blocked NCO groups |
| | | solids content: 70% |
| | | blocked NCO content: 9.6% |
| | | viscosity at 23° C.: about 6000 mPas |
| | | appearance: clear, almost colourless |
| | | NCO equivalent: 435 g |

Experimental

The polyisocyanate and methoxypropyl acetate were placed in a reaction vessel and heated to about 50° C. The mixture of malonic ester and 1.2 g Na methylate solution (as a 30% solution in methanol) were added to this stirred solution and the batch was subsequently stirred for 2 hours at 70° C. until the NCO content was less than the calculated value of 7.6%. The colourless flakes of triazole were then added thereto, the internal temperature was raised to 90° C. and the batch was subsequently stirred for about 3 hours until NCO groups could no longer be detected. The batch was cooled to about 45° C. and the solution of paraformaldehyde, isobutanol and 0.3 g Na methylate solution (30%) was added thereto, followed by stirring for 1 hour at 40–45° C. Finally, 2.1 g dibutyl phosphate were added thereto, whereupon a clear, almost colourless solution of a blocked polyisocyanate crosslinking agent was obtained which was stable on storage for 6 months.

Example 2

Comparative Example

The nature and amounts of substances used in this example were the same as in Example 1, with the exception that modification of the blocked polyisocyanate with formaldehyde was omitted. This resulted in a product which started to crystallise out after storage for one week at room temperature. This blocked polyisocyanate thus cannot be used in single-component lacquer formulations which are stable on storage.

Example 3
(According to the Invention)

This mixture-blocked polyisocyanate was stabilised with 2.7% of stabilisers with respect to the solids content of the blocked polyisocyanate. In addition two further stabilisers (see EP-A 829 500 A2) were admixed with the blocked polyisocyanate solution, namely 2.0% of a hydrazide as mentioned above and 1.0% of a HALS amine.

| Batch | | |
|---|---|---|
| 300.0 g | (1.5 equivalents) | of an isocyanurate-containing lacquer polyisocyanate based on 1,6-diisocyanato-hexane (HDI) with an NCO content of about 21%, a viscosity of about 3000 mPas at 23° C. and a functionality of about 3.5 |
| 120.0 g | (0.75 mol) | diethyl malonate |
| 51.7 g | (0.75 mol) | 1,2,4-triazole |
| 13.5 g | (0.3 mol) | paraformaldehyde |
| 4.9 g | (1%/solids) | Tinuvin φ 770 DF (Novartis AG) |
| 9.8 g | (2%/solids) | of the hydrazine addition product explained in the test comprising 1 mole of hydrazine hydrate and 2 moles propylene carbonate, with a molecular weight of 236 |
| 107.8 g | | methoxypropyl acetate |
| 107.8 g | | isobutanol |
| 715.5 g | (1.5 equivalents) | blocked NCO groups |
| | | solids content: 70% |
| | | blocked NCO content: 8.8% |
| | | viscosity (23° C.): about 5000 mPas |
| | | appearance: clear, Hazen colour 60 |
| | | NCO equivalent (blocked): 477 g |

Experimental

The polyisocyanate and methoxypropyl acetate were placed in a reaction vessel. The mixture of diethyl malonate with about 2%, i.e. 2.4 g, of Na methylate solution (a 30 % solution in methanol) were added in portions at about 50° C., with stirring. The temperature was raised to 70° C. and the batch was stirred for about 1½ hours until the NCO content was less than the calculated value of 5.95%. The colourless flakes of triazole were then added thereto, the temperature was raised to 90° C. and the batch was subsequently stirred for about 3 hours until NCO groups could no longer be detected (IR spectrum). The batch was cooled to 45° C. and a solution comprising a portion of the isobutanol, paraformaldehyde, and 0.5 g Na methylate solution (30%) was added thereto. The batch was subsequently stirred for about 1 hour at 45° C. Thereafter, Tinuvin 770 DF, namely the hydrazine addition product described above, was added together with the remaining isobutanol. Finally, 3.5 g dibutyl phosphate were stirred in, whereupon a clear, almost colourless (Hazen colour 60) solution of the mixture-blocked polyisocyanate crosslinking agent was obtained which was stable on storage and which had an NCO equivalent (blocked) of 477 g.

Example 4

Example of Use

The crosslinking agent from Example 3 was mixed with the following components to give a clear lacquer. This clear lacquer was applied to test panels which were coated with a commercially available base lacquer, e.g. that supplied by Spies & Hecker of Cologne, to give a wet coat thickness of about 120 to 150 μm, and were stoved and tested as explained in the following Table.

| Formulation | |
|---|---|
| 37.2 g | Desmophen ® A VP LS 2009/1, 70% solution in BA (Bayer AG), OH equivalent 565 g |
| 31.4 g | crosslinking agent as in Example 3 mixture ratio: NCO:OH = 1:1 |
| 0.5 g | dibutyltin dilaurate, 100% |
| 11.2 g | methoxypropyl acetate/solvent naphtha ® 100 (1/1) |

| Results of lacquer technology tests | |
|---|---|
| sprayed solids (%) at a run-out time of 23 sec | about 50% |
| stoving conditions | 30 min at 140° C. |
| pendulum damping (oscillations)[1] (s) | 143 200 |
| resistance to solvents (ranking*)[2] (X/MPA/EA/AC) | |
| 1 min | 1234 |
| 5 min | 2244 |
| resistance to chemicals (° C.)[3] (gradient oven method) | |
| resin | 36 |
| brake fluid | 36 |
| pancreatin, 50% | 36 |
| NaOH, 1% | 36 |
| $H_2SO_4$, 1% | 41 |
| FAM: 10 min. (ranking*) | 2 |
| thermal yellowing[4] | |
| clear lacquer on LM base lacquer | |
| initial yellowing (b) | 0.1 |
| yellowing after over-stoving for 30 min at 160° C. (Δb) | 1.9 |
| clear lacquer on $H_2O$ base lacquer | |
| initial yellowing (b) | −1.2 |
| yellowing after over-stoving for 30 min at) 160° C. (Δb) | 1.2 |
| scratch-resistance (laboratory washing train)[5] | |
| initial 20° gloss | 90.8 |
| loss in gloss after 10 washing cycles | 23.2 |

*)0 - good; 5 - poor

As can be seen, the system according to the invention exhibits good lacquer properties as a whole.

1) DIN ISO 1522
2) Bayer test method; assessment according to DIN 53230
3) according to Daimler-Benz test method
4) DIN 6174 (CIELAB)
5) according to DFO test method Deutsche Forschungsgesellschaft für Oberflachenbehandlung e.V. Düsseldorf

What is claimed is:

1. An aliphatic and/or cycloaliphatic polyisocyanate having blocked isocyanate groups wherein
   A) 5–95 equivalent % of the isocyanate groups are blocked with an acidic CH ester,
   B) 5–95 equivalent % of the isocyanate groups are blocked with 1,2,4-triazole,
   C) 0–10 equivalent % of the isocyanate groups are blocked with a blocking agent different from A) and B),
   D) the percentages of A), B) and C add up to 100%, and
   E) said aliphatic and/or cycloaliphatic polyisocyanate having blocked isocyanate groups contains 0.05–1.0 mole of formaldehyde in chemically incorporated form, based on 1 equivalent of blocked NCO groups.

2. The aliphatic and/or cycloaliphatic polyisocyanate having blocked isocyanate groups of claim 1 wherein said aliphatic and/or cycloaliphatic polyisocyanate having blocked isocyanate groups contains
   a) 0.1–5.0% by weight of a hydrazide stabilizer against thermal yellowing containing a structural unit of formula (I)

and
   b) 0.1–5.0% by weight of a hindered amine light stabilizer containing a structural unit of formula (II)

3. A process of producing a non-crystallizing aliphatic and/or cycloaliphatic polyisocyanate having blocked isocyanate groups which comprises reacting an aliphatic and/or cycloaliphatic polyisocyanate having blocked isocyanate groups wherein
   A) 5–95 equivalent % of the isocyanate groups are blocked with an acidic CH ester,
   B) 5–95 equivalent % of the isocyanate groups are blocked with 1,2,4-triazole,
   C) 0–10 equivalent % of the isocyanate groups are blocked with a blocking agent different from A) and B), and
   D) the percentages of A), B) and C add up to 100% with 0.05–1.0 mole of formaldehyde, based on 1 equivalent of blocked isocyanate groups.

4. A polyurethane stoving lacquer containing the blocked polyisocyanate of claim 1 as a crosslinking agent and an organic polyhydroxyl compound.

5. An aliphatic and/or cycloaliphatic polyisocyanate having blocked isocyanate groups wherein
   A) 5–95 equivalent % of the isocyanate groups are blocked with an acidic CH ester,
   B) 5–95 equivalent % of the isocyanate groups are blocked with 1,2,4-triazole,
   C) 0–10 equivalent % of the isocyanate groups are blocked with a blocking agent different from A) and B),
   D) the percentages of A), B) and C add up to 100%, and
   E) said aliphatic and/or cycloaliphatic polyisocyanate having blocked isocyanate groups contains 0.8–5.0% by weight of formaldehyde in chemically incorporated form, based on the weight of said aliphatic and/or cycloaliphatic polyisocyanate having blocked isocyanate groups.

6. The aliphatic and/or cycloaliphatic polyisocyanate having blocked isocyanate groups of claim 5 wherein said aliphatic and/or cycloaliphatic polyisocyanate having blocked isocyanate groups contains
   a) 0.1–5.0% by weight of a hydrazide stabilizer against thermal yellowing containing a structural unit of formula (I)

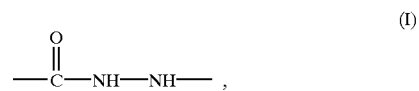

and
   b) 0.1–5.0% by weight of a hindered amine light stabilizer containing a structural unit of formula (II)

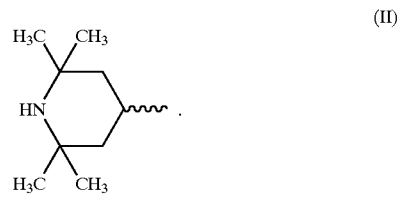

7. A process of producing a non-crystallizing aliphatic and/or cycloaliphatic polyisocyanate having blocked isocyanate groups which comprises reacting an aliphatic and/or cycloaliphatic polyisocyanate having blocked isocyanate groups wherein
   A) 5–95 equivalent % of the isocyanate groups are blocked with an acidic CH ester,
   B) 5–95 equivalent % of the isocyanate groups are blocked with 1,2,4-triazole,
   C) 0–10 equivalent % of the isocyanate groups are blocked with a blocking agent different from A) and B), and
   D) the percentages of A), B) and C add up to 100% with 0.8–5.0% by weight of formaldehyde, based on the weight of said aliphatic and/or cycloaliphatic polyisocyanate having blocked isocyanate groups.

8. A polyurethane stoving lacquer containing the blocked polyisocyanate of claim 5 as a crosslinking agent and an organic polyhydroxyl compound.

* * * * *